US006751189B1

(12) United States Patent
Gullicksen et al.

(10) Patent No.: US 6,751,189 B1
(45) Date of Patent: Jun. 15, 2004

(54) VIRTUAL LINE SWITCHED RING (VLSR) CONNECTION STATE DISTRIBUTION SCHEME

(75) Inventors: Jeffrey Gullicksen, Mountain View, CA (US); William Kish, Saratoga, CA (US); Theodore E. Tedijanto, Cupertino, CA (US)

(73) Assignee: Ciena Corporation, Linthicum, MD (US)

( * ) Notice: Subject to any disclaimer, the term of this patent is extended or adjusted under 35 U.S.C. 154(b) by 322 days.

(21) Appl. No.: 09/904,623

(22) Filed: Jul. 13, 2001

Related U.S. Application Data (63) Continuation-in-part of application No. 09/421,062, filed on Oct. 19, 1999, now Pat. No. 6,654,341.

(51) Int. Cl.[7] .......................... G01R 31/08; H04L 12/28
(52) U.S. Cl. ...................... 370/216; 370/258; 370/404; 398/3; 710/19
(58) Field of Search ................................ 370/216, 244, 370/222, 254, 258, 389, 400, 401, 404, 467, 469, 907; 710/19; 709/251, 230, 313; 398/3

(56) References Cited

U.S. PATENT DOCUMENTS

| 5,218,604 | A | * | 6/1993 | Sosnosky ................. 370/85.14 |
| 5,355,362 | A | | 10/1994 | Gorshe et al. ............. 370/16.1 |
| 5,870,212 | A | * | 2/1999 | Nathan et al. .............. 359/119 |
| 6,122,250 | A | | 9/2000 | Taniguchi ................... 370/222 |
| 6,144,633 | A | | 11/2000 | Ikeda et al. ................. 370/217 |

* cited by examiner

Primary Examiner—Duc Ho
(74) Attorney, Agent, or Firm—Michael R. Cammarata; David L. Soltz (57) ABSTRACT

Systems and methods consistent with this invention allow for each node within one or more rings to obtain connection and topology information from other nodes within these rings. In such a system, each node is able to maintain connection table and topology tables for each node and each ring within a ring network. In particular, such information can be kept current because this scheme allows for dynamic updating of connection and topology information in real time. With such current information, a node is able to utilize this information to execute such operations as squelching connections on a protect line and timeslot interchange. In addition, by supporting timeslot interchange, the ring can be managed as more than a single logical entity as well as can have better bandwidth management utilization.

1 Claim, 13 Drawing Sheets

VIRTUAL LINE SWITCHED RING (VLSR) CONNECTION STATE DISTRIBUTION SCHEME

RELATED APPLICATIONS

This application is a continuation-in-part of U.S. patent application Ser. No. 09/421,062, now U.S. Pat. No. 6,654, 341 entitled "VIRTUAL LINE SWITCHED RING," filed on Oct. 19, 1999 and related to U.S. patent application Ser. No. 09/259,263, filed Mar. 1, 1999, entitled "ROUTING AND SIGNALING IN A SONET NETWORK", both of which are incorporated by reference herein in their entirety.

BACKGROUND OF THE INVENTION

The present invention relates to a method and system for implementing a virtual line-switched ring connection state distribution scheme within a line switched ring network carrying optical signals in accordance with a synchronous optical network (SONET) standard.

Figure 1:
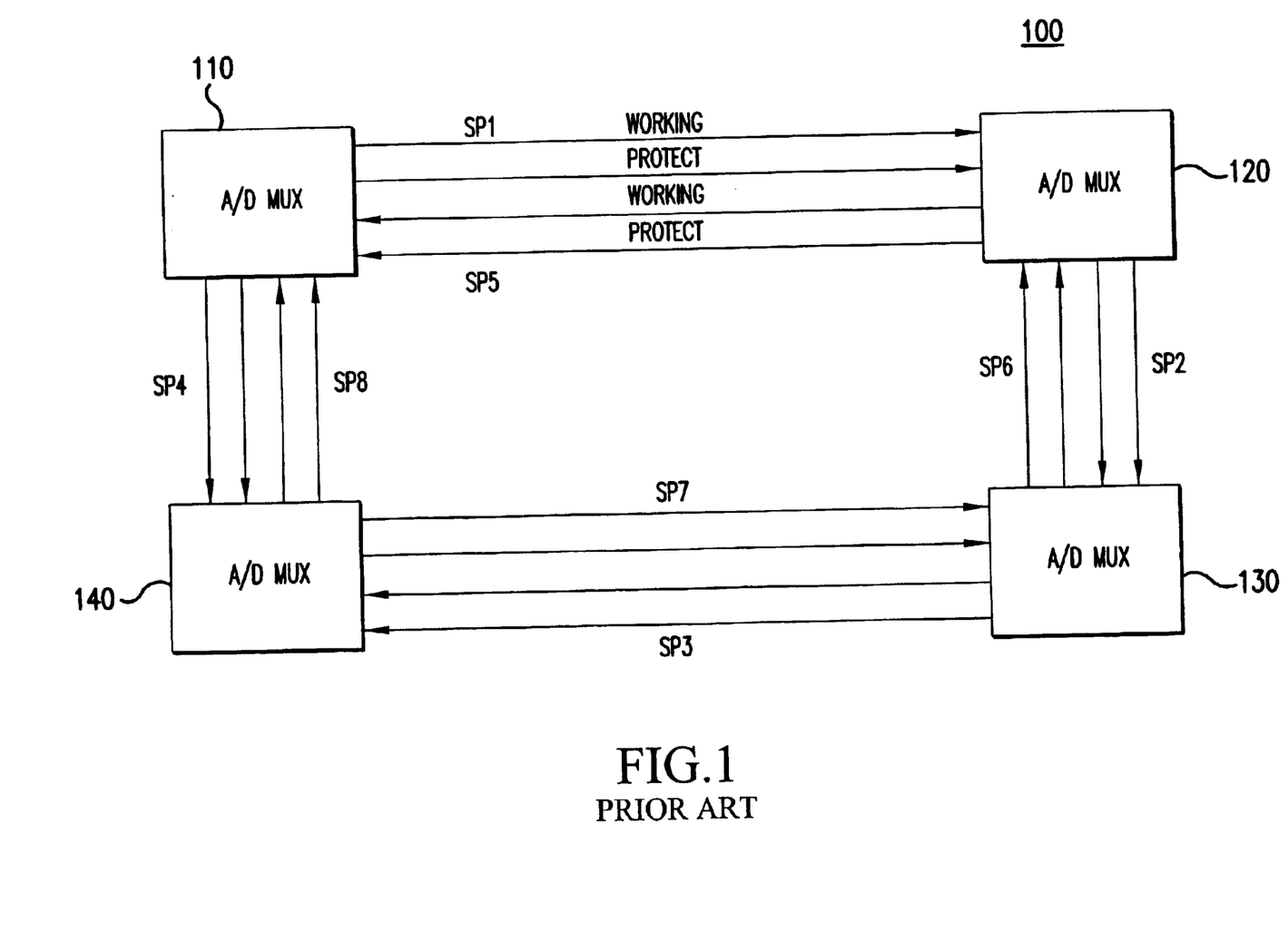
FIG. 1 shows a bi-directional line switched ring according to the prior art.

SONET networks often have a ring configuration including a collection of nodes forming a closed loop. FIG. 1 illustrates an example of a conventional SONET bi-directional ring 100 whereby information may flow in either a clockwise or counterclockwise in the figure, as indicated by arrows labeled "working" and "protect". Add-drop multiplexers (A/D mux) 110, 120, 130 and 140 add and/or drop signals to switch data from one span (SP1 to SP7) to another. Ring 100 is thus termed a "bi-directional line switched ring" or BLSR, and data transmitted in such a ring typically must conform to a particular protocol.

As further shown in FIG. 1, each of spans SP1 to SP7 includes one working line and a corresponding protection line. For example, spans SP1 and SP5 interconnect A/D muxes 110 and 120 and include working lines carrying data in opposite directions. The working lines within each of these spans further include respective protection lines for transmitting data in the event the associated working line fails.

The SONET ring provides protection for transmission of data in two way. First if a working lines fails, the corresponding protection lines may be used. In the alternative, if working lines fail between two A/D muxes, any communication route directed through the failed line may be rerouted through the A/D muxes through a process known as span switching. For example, if the working lines between A/D mux 110 and A/D mux 120 fail, instead of using the corresponding protection lines, communications may be sent from A/D mux 110 to A/D mux 120 via A/D mux 140 and 130.

Typically, the working and protect lines are provided in a fiber optic bundle. Accordingly, if the working line fails, due to a fiber cut, for example, the corresponding protect line often will also fail. Span switching is thus often preferred to simply switching data from the faulty working line to the protect line. Both schemes may be used in conjunction with each other, however, whereby an attempt is first made to use the protect line when the associated working line fails, and then, if the protection line is itself faulty, span switching is used to redirect communications.

The SONET standard has a plurality of optical levels and logical levels that represent the amount of optical information a line is capable of carrying at a given time. These different optical levels are referred to as OC-n, where n is indicative of the bandwidth or capacity associated with the line. Current SONET bi-directional rings require that all spans carry data at the same optical rate because A/D muxes can only direct communications from one line to another having the same OC-n level. Therefore, BLSR requires that all lines in the network are of the same type and that each span between A/D muxes has the same number of lines.

In accordance with the SONET standard, spans transfer units of information called Synchronous Transport Signals (STS). For the different optical carrier levels OC-n (such as OC-1, OC-3 and OC-12), there is a corresponding STS-n, where n is the number of STS-1 segments or time slots. Typical spans are composed of 1, 3, 12, 48, or 192 STS-1's. All SONET spans transmit 8,000 frames per second, where each frame is composed of an integer number of STS-1 segments, such as 1, 3, 12, 48 or 192.

Each STS-1 segment includes a payload section and an overhead section. The overhead includes K-bytes that communicate error conditions between spans in a network and allow for link recovery after network failure. K-byte signaling takes place over the protection lines. In a series of STS segments, only K-bytes from the first STS-1 segment are used to carry error data. Current SONET networks make no use of the framing overhead of the remaining STS-1 segments. The series of STS-1 segments only carries K-byte error information for a single ring.

Figure 2:
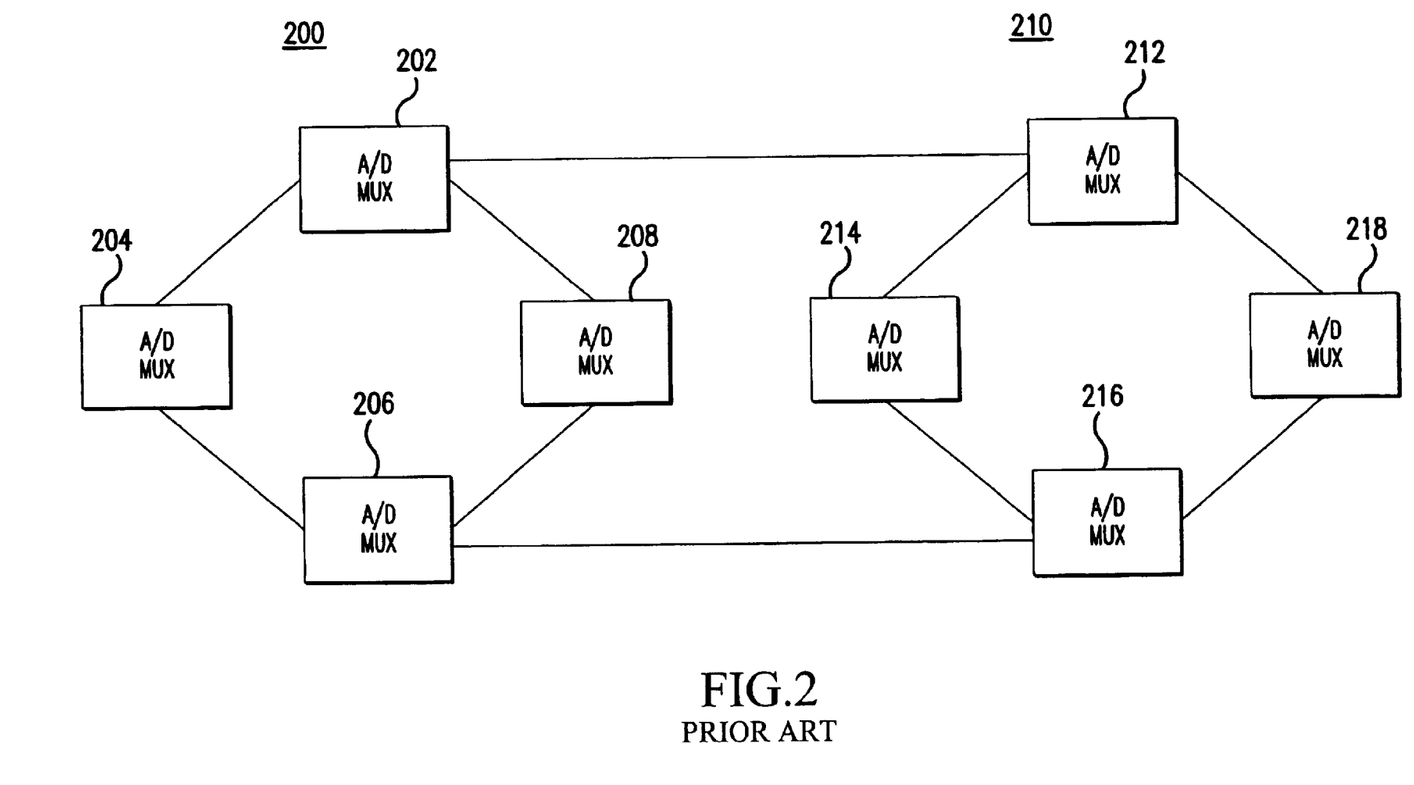
FIG. 2 shows two connected bi-directional rings according to the prior art.

FIG. 2 illustrates an example of a connection between two rings 200 and 210 using four SONET A/D multiplexors. Specifically, A/D mux 202 of ring 200 is coupled to A/D mux 212 of ring 210, while A/D mux 206 of ring 200 is coupled to A/D mux 216 of ring 210. Data is transmitted on these connections at a slower rate than through rings 200 and 210. Thus, a total of four "matched" A/D mux nodes are often required to connect two rings. Typically, each such pair of A/D muxes is dedicated to providing ring-to-ring connections, and are not configured to pass information around a ring and forward information to another ring at the same time.

In the SONET network ring environment, there currently does not exist a system, which allows a ring node to automatically manage connection and topology information regarding the ring as well as to manage the ring as more than a single logical entity.

SUMMARY OF THE INVENTION

Systems and methods consistent with this invention allow for each node within one or more rings to obtain connection and topology information from other nodes within these rings. In such a system, each node is able to maintain connection table and topology tables for each node and each ring within a ring network. In particular, such information can be kept current because this scheme allows for dynamic updating of connection and topology information in real time. With such current information, a node is able to utilize this information to execute such operations as squelching connections on a protect line and timeslot interchange. In addition, by supporting timeslot interchange, the ring can be managed as more than a single logical entity as well as can have better bandwidth management utilization.

Both the foregoing general description and the following detailed description explain examples of the present invention and do not, by themselves, restrict the scope of the appended claims. The accompanying drawings, which constitute a part of this specification, illustrate systems and methods consistent with the invention and, together with the description, help explain the principles of the invention.

BRIEF DESCRIPTION OF THE DRAWINGS

The accompanying drawings, which are incorporated in and constitute part of this specification, illustrate embodiments of the invention and, together with the description, serve to explain the advantages of the invention. In the drawings.

DETAILED DESCRIPTION OF THE INVENTION

The following detailed description refers to the accompanying drawings. The same reference numbers in different drawings identify the same or similar elements. Also the following detailed description does not limit the invention. Instead, the scope of the invention is defined by the appended claims.

Systems and methods consistent with the principles of the present invention provide a SONET ring network that uses switches at the nodes allowing for sharing a switch to connect a plurality of rings. The present invention also provides for sharing a protection line between a plurality of rings by utilizing overhead provided for in the SONET standard. Finally, the present invention provides for having a different number and type of lines between nodes by using switches and an algorithm to regulate the updating of the lines.

Figure 3:
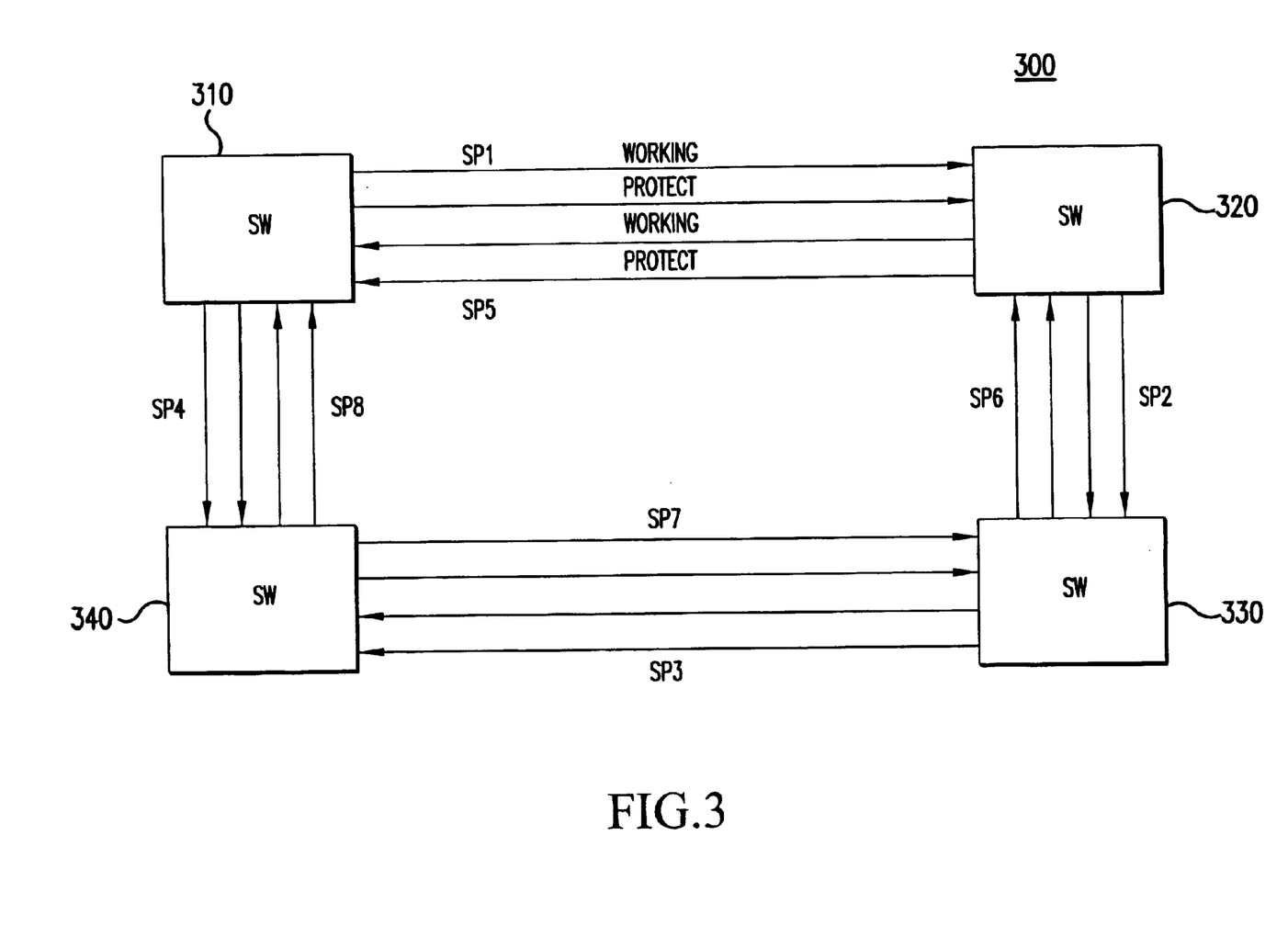
FIG. 3 shows a virtual line switched ring in accordance with the present invention.

The present invention, as shown in FIG. 3, uses switches as nodes in a SONET network. For example, SONET ring 300 includes switches 310, 320, 330 and 340 coupled to various working and protection lines. Specifically, there are two working lines and two protection lines between each pair of switches. Information is transferred through SONET ring 300, typically in a time division multiplexed fashion, through pluralities of input and output ports in each switch.

Figure 4A:
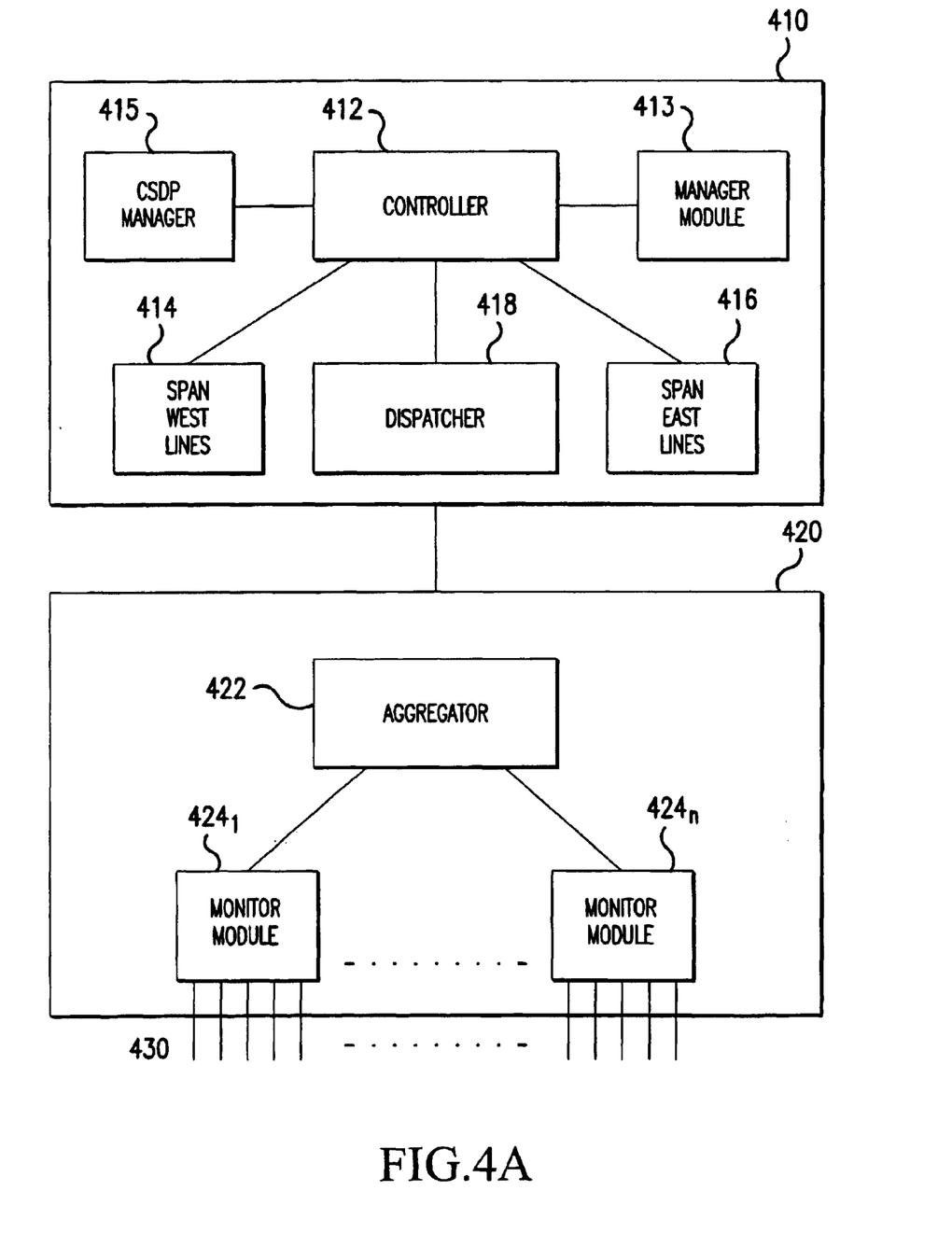
FIG. 4A shows a switch and line card in accordance with the present invention.
Figure 4B:
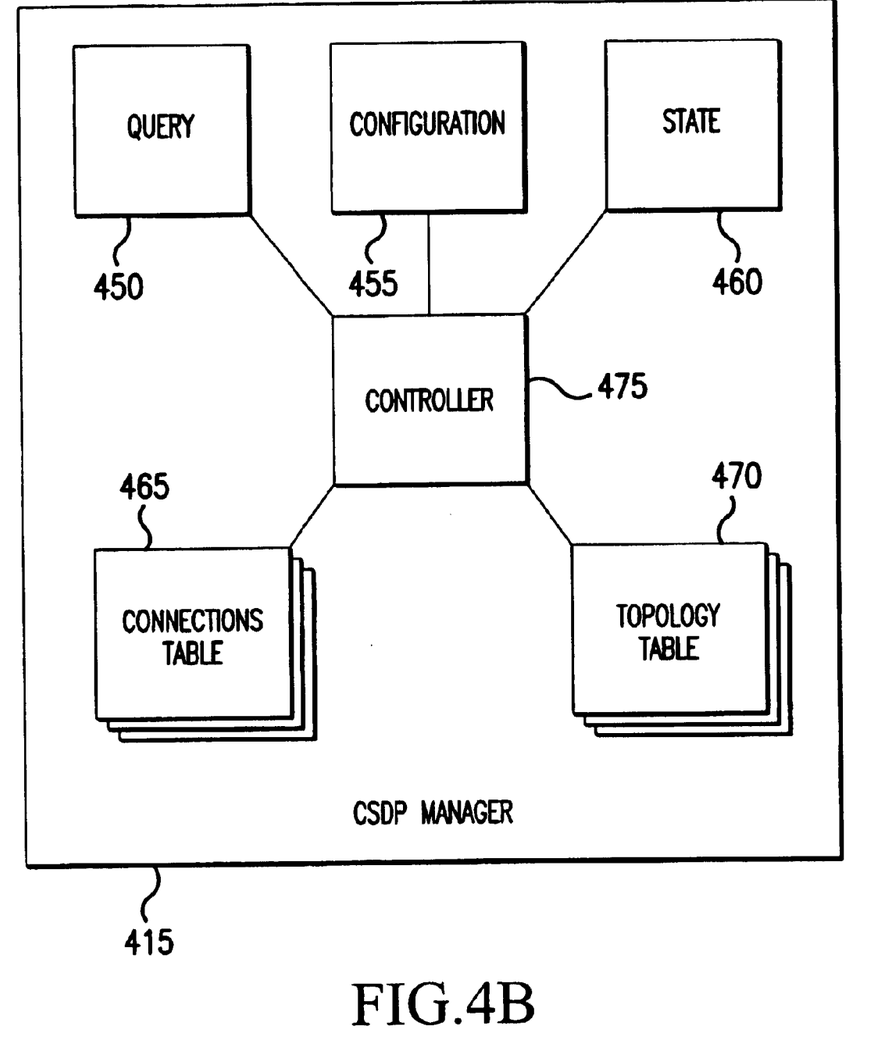
FIG. 4B shows a connection state distribution protocol module in accordance with the present invention.

FIG. 4A shows an example of a switch consistent with the present invention. Switch 410 includes controller 412, manager module 413, span west lines 414, span east lines 416, a Connection State Distribution Protocol ("CSDP") manager 415 and a dispatcher circuit 418. Controller 412 oversees general operations of the switch 410 and is used by the manger module 413 and dispatcher 418 to process and forward information. Manger module 413 manages virtual lines of span west lines 514 and span east lines 416. FIG. 4B illustrates a more detailed embodiment of the CSDP Manager 415. The CSDP Manager 415 includes a CSDP controller 475, a query module 450, a configuration module 455, a state module 460, a connections table 465 and a topology table 470. The CSDP Manager 415 is responsible for providing the switch 410 with the ability to auto-discover the connection characteristics of each node and the topology of the ring. The CSDP controller 475 is coupled to the query module 450, the configuration module 455, the state module 460, the connections table 465 and the topology table 470. The CSDP controller 475 is responsible for managing the generation and processing of CSDP messages, which are transmitted and/or received by the switch 410. The query module 450 is responsible for processing and generating CSDP query messages. The configuration module 455 is responsible for processing and generating CSDP config messages. The state module 460 is responsible for processing and generating CSDP state messages. The connections table 465 includes connection information for each node on a ring. The topology table 470 includes topology information for each ring in a network. The data contained within the connections table 465 and the topology table 470 can be accessed by any module within the switch 410 in order to perform operations in configuring the node as well as to determining additional relationships as to the various nodes within the ring. Dispatcher 418 receives and processes data from external sources.

Switch 410 is connected to a line card 420 having an aggregator 422 and a plurality of monitor modules $424_1$ to $424_n$. Aggregator 422 gathers information from monitor modules 424 and passes the information to appropriate switches via monitor modules 424. Each monitor module 424 has a plurality of physical SONET lines 430 that connect to other switches. Physical lines 430 are logically designated by switch 410 to correspond to virtual lines associated with the span west lines 414 and span east lines 416. Span west lines 414 and span east lines 416 define the logical mapping between physical lines and logical lines, where the logical lines may come from any combination of monitor modules 424. The designation of west and east lines is only a logical designation. This logical designation is used to distinguish between the different network nodes to which switch 410 is connected. In one embodiment, the span west lines 414 define logical lines leading to one switch in the network, while the span east lines 416 define logical lines leading to another switch in the network.

Figure 5:
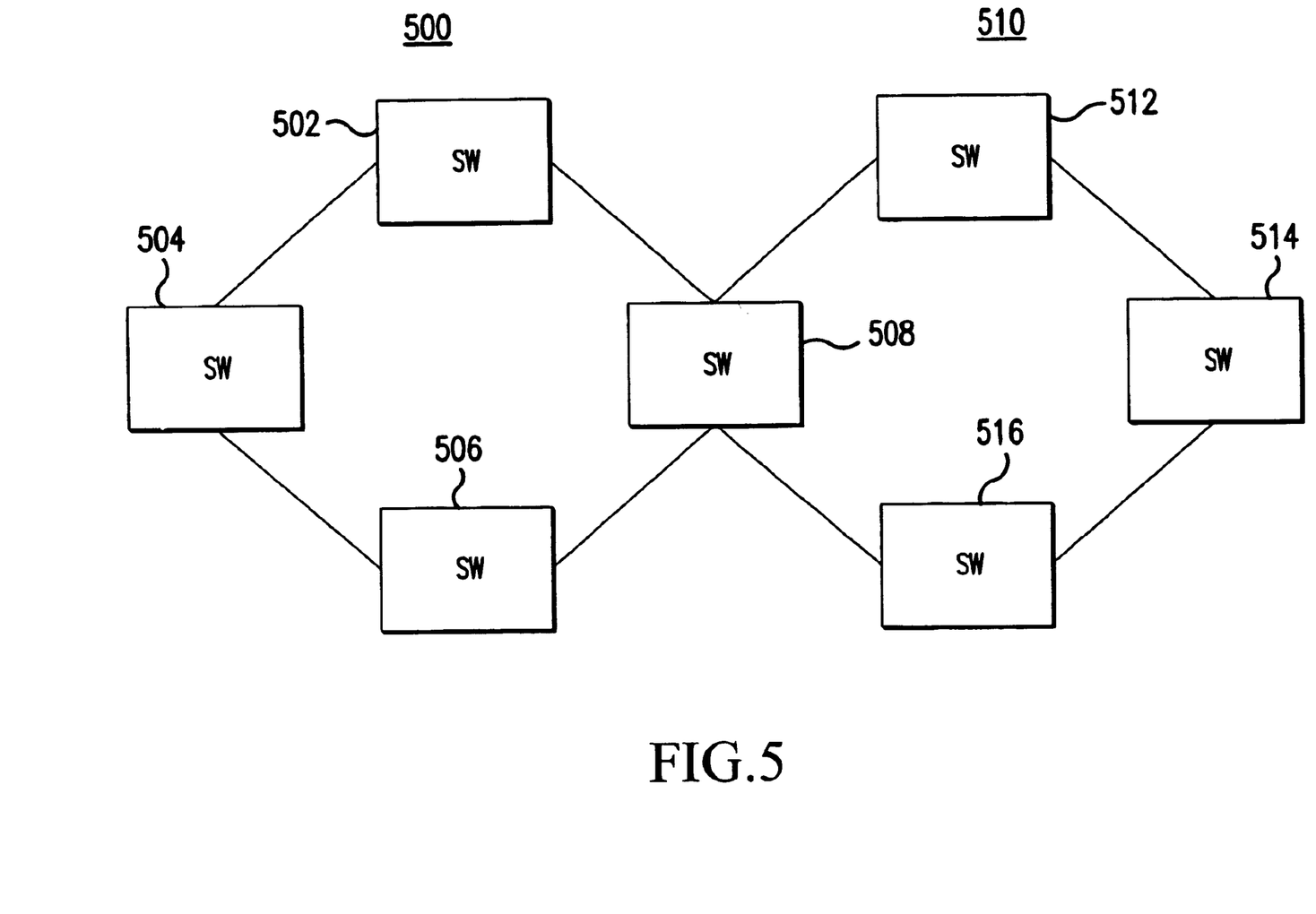
FIG. 5 shows two connected virtual line switched rings in accordance with the present invention.

Since switch 410 simultaneously transfers information between a plurality of different SONET lines of information, the present invention allows for two rings to share a switch, or be connected by sharing a switch. For example, as seen in FIG. 5, SONET network ring 500 and SONET network ring 510 are connected by sharing switch 508. Ring 500 includes switches 502, 504, 506, and 508. Ring 510 includes switches 508, 512, 514, and 516. By using a single switch to connect rings, information is passed over SONET lines at the same rate between rings as is passed within a single ring.

Figure 6:
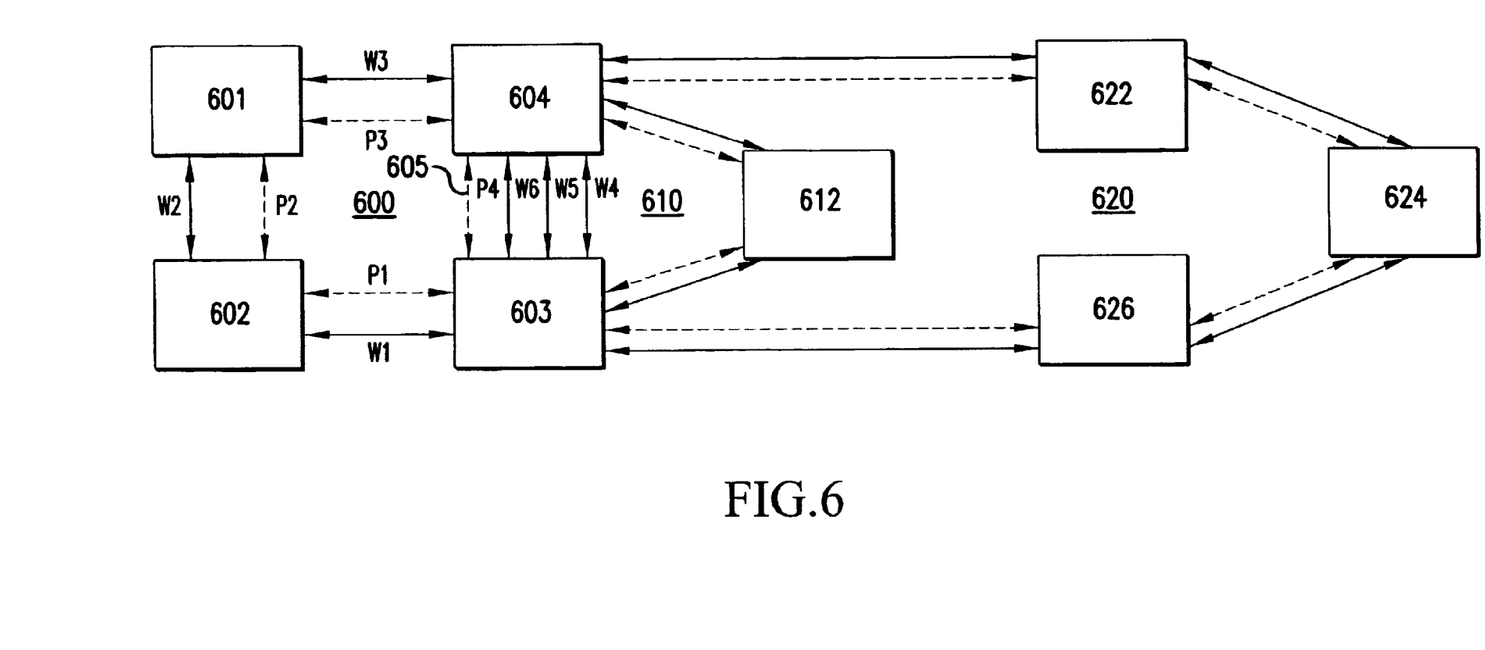
FIG. 6 shows three connected virtual line switched rings sharing a protection line in accordance with the present invention.

More than two SONET rings may share a switch. As shown in FIG. 6, three SONET rings share two switches. Ring 600 includes switches 601, 602, 603, and 604. Ring 610 includes switches 603, 604, and 612. Ring 620 includes switches 603, 604, 622, 624, and 626. As further illustrated in FIG. 6, each working and protect line in ring 600 is assigned a particular identifier, e.g., working line one (w1) and protection line 1 (p1).

In addition to sharing switches among rings, the rings of FIG. 6 share protection line p4 (605). Moreover, between each switch and its neighbor there is a working line, which is shown as a solid line, and a protection line, which is shown as a dotted line. Three working lines connect switch 603 to switch 604, one for each ring, and one protection line 605 which is shared by all of the rings. The sharing of a protection line is not required between these switches; three dedication protection lines could have been provided between these two switches instead. When rings share a protection line, however, the protection line is allocated for use on a first-come, first served basis. Individual STS-1 segments on the protection line are allocated to replace the working lines on an STS-1 segment basis. One protection line may carry portions of STS-1 segments from more than one working line.

Multiple rings may share a protection line by utilizing K-byte signaling on multiple STS-1 segments. As previously discussed, K-bytes carry error information related to line failures for a ring. Errors noted in the K-byte may initiate switching between a working and protection line. For example, criteria for switching between a working and protection lines are generally the same, and may include loss of signal, loss of frame, an alarm indication signal, or a single failure. In which case, K-byte codes may include: block out of protection code, forced span switch code, forced ring switch code, signal fail-span code, signal fail-ring code, and signal degrade code, among others.

Conventional BLSR only allows for one ring to use a protection line and only uses the first K-bytes from the first STS-1 in a series of STS-1 segments to report errors for the single ring. Even though not used, the current SONET protocol includes K-byte overhead in each STS-1 of a series of STS-1 segments for additional rings. The present invention uses these K-bytes in the succeeding STS-1 segments to realize shared protection lines. In particular, each ring has separate K-byte information to reflect errors within the ring. When one or more rings use a protection line, the K-byte information is carried over that protection line for each ring, and is carried in respective sequential STS-1 segments. The switches on either end of the protection line that is being shared are programmed with information defining which STS-1 segment is carrying the K-byte information for which ring. For example, the first segment may contain the K-byte information for ring 610, and the third segment contains the K-byte information for ring 620. Switches 603 and 604 are thus programmed with information defining which STS-1 segment carries the K-byte information for which ring based on the received order of the STS-1 segments. In addition, K-byte information concerning the availability of a particular protection line is passed to other switches in the rings through appropriate signaling, as discussed in greater detail below.

Returning to FIG. 4A, monitor module 424 monitors incoming K-bytes. More particularly, monitor module 424 monitors incoming K-bytes for changes indicating an error. When a K-byte change for a particular ring is maintained for at least three consecutive frames monitor module 424, monitor module 424 reads the value of the K-bytes and sends the change to aggregator 422. Aggregator 422 queues the K-byte information from other monitor modules 424, and after a period of time, such as one millisecond, sends a message to switch 410 that includes the K-byte changes, and the lines that have signal failure or degradation. Dispatcher 418 parses the message from the aggregator 422 and sends line information to span west lines 414 or span east lines 416 if either of these utilize the line in question. The span receiving the line information may do nothing if higher priority conditions exist, or may initiate a line switch, ring switch, or route change.

Figure 11:
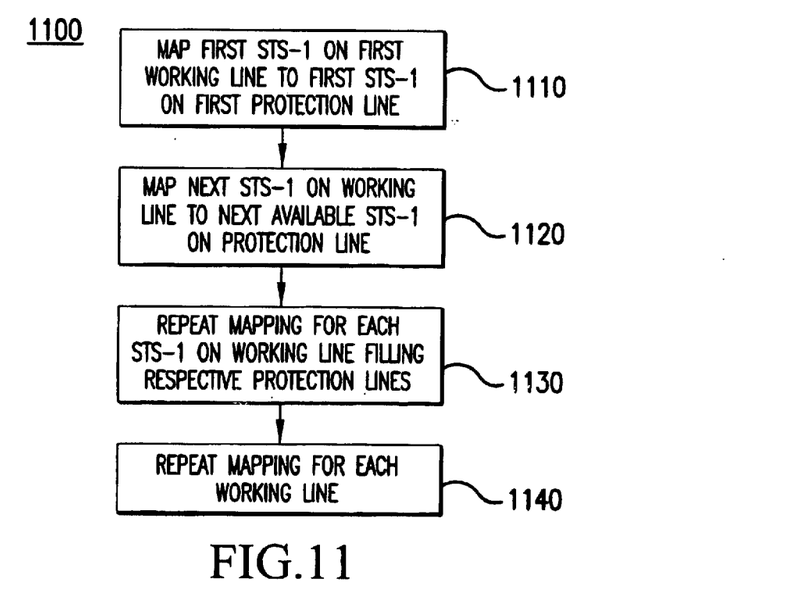
FIG. 11 illustrates a process for assigning working lines to protection lines.

FIG. 11 illustrates steps of a process 11 for mapping working lines to corresponding protections lines. The mapping is performed on a first-come, first served basis, and should conform to an ordering dictated by a network administrator. In a first step 1110, a first STS-1 on a first working line is mapped to a first STS-1 of a first protection line. In step 1120, the next STS-1 of the working line is mapped to the next available STS-1 of a protection line. Each remaining STS-1 of the working line is mapped to a respective STS-1 on a protection line (step 1130). Steps 1110 through 11130 are repeated for each remaining working line (step 1140).

Figure 12:
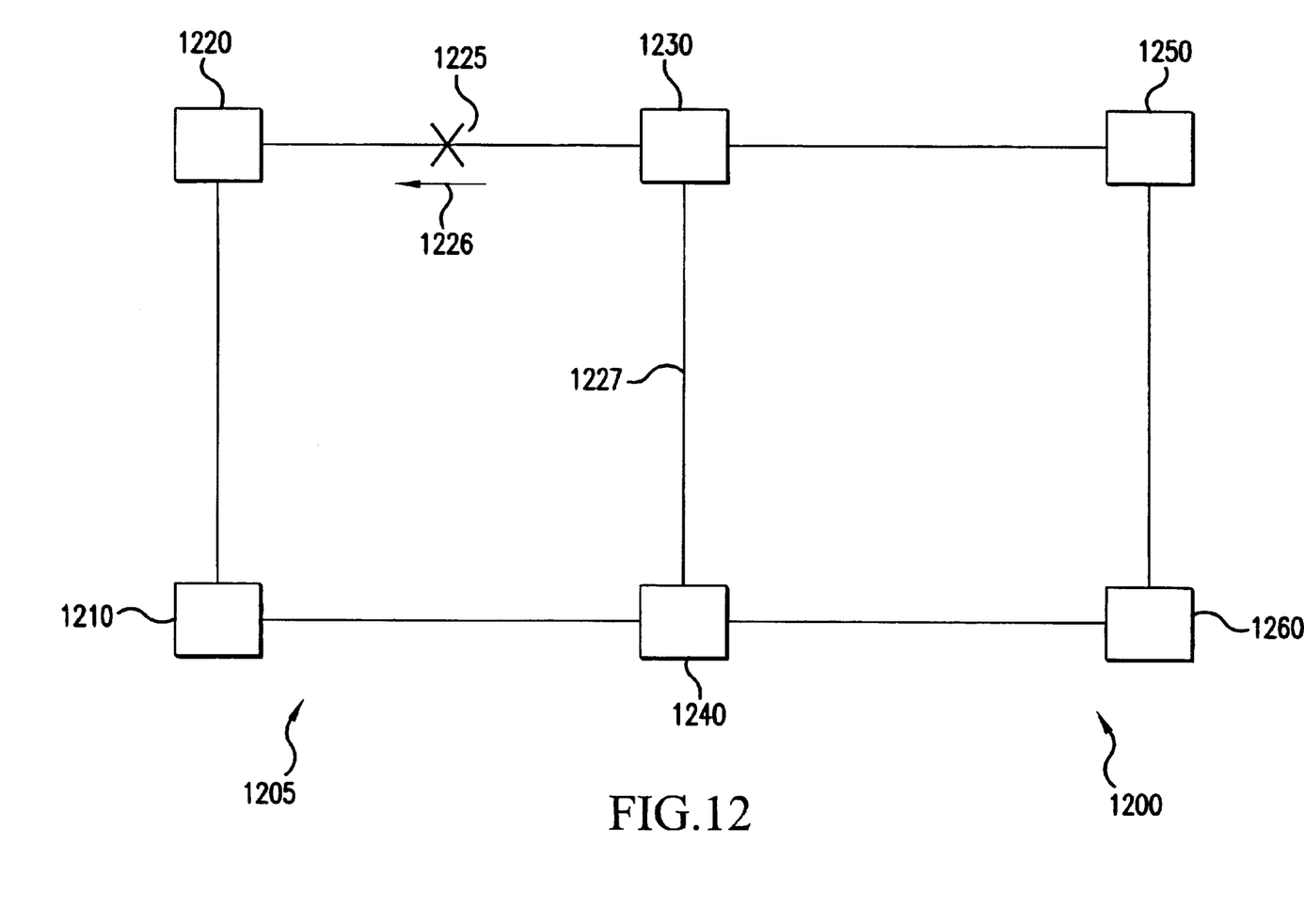
FIG. 12 illustrates two SONET ring networks configured in accordance with a feature of the present invention.

The invention will next be described by way of example with reference to FIG. 12 showing first and second rings 1200 and 1205. Within ring 1200, working traffic originating at switch 1230 and terminating at switch 1220 is passed along span 1225 in a east-west direction as indicated by arrow 1226. If a break occurs in span 1226 (as indicated by an "X"), traffic is rerouted through switches 1210 and 1240 using a shared protection line in span 1227, which is assigned in accordance with processes and structures identified above. In this case, a K-byte ring switch signal is supplied from switch 1230 to switch 1240 and then to switches 1210 and 1220 to thereby indicate use of the protection line in ring 1205, at least for particular time slots so affected by the break in span 1226. Switch elements in ring 1200, however, must further follow an arbitration protocol whereby the protection line in span 1227 is rendered not available to them, at least for those time slots. Accordingly, switch 1230 passes known K-byte lockout-protection span (LP-S) data to switch 1240, which in turn, forwards this data to remaining switches 1260 and 1250 in ring 1200. Thus, information concerning availability of a particular protection line, as well, as information concerning a fault in a particular span is distributed amongst the switching elements of a given network through K-byte signaling.

Figure 7:
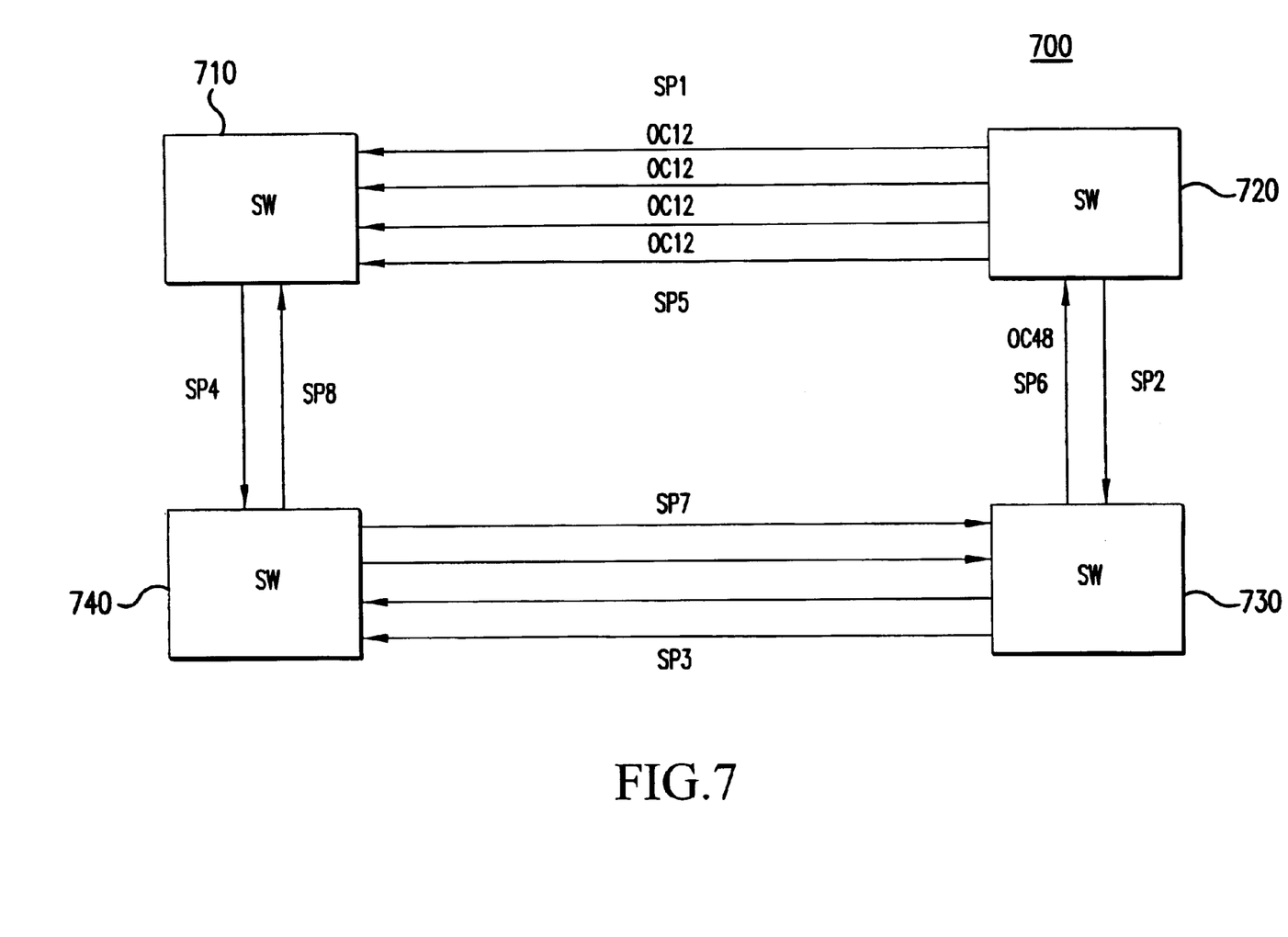
FIG. 7 shows a virtual line switched ring having varying numbers and types of lines between switches in accordance with the present invention.

In another embodiment, systems and methods consistent with the principles of the present invention utilize a varying number and type of lines between switches in a SONET ring network. As discussed above, current SONET networks require the same number of optical carrier level type of lines between nodes. The present invention, however, allows for different combinations of optical carrier lines between switches, thereby providing greater network flexibility. Switch 410 has a plurality of ports and can split information from one line into many lines, or combine information from many lines and output the information on a single line. As shown in FIG. 7, SONET ring network 700 has switches 710, 720, 730, and 740. The connections between these switches are not the same for every span. For example, between switch 710 and switch 720, there are two optical carrier 12 (OC-12) working lines in each direction. Between switch 720 and switch 730, there is one OC-48 working line going in each direction between the switches. Consistent with the present invention, any combination of optical carrier levels may be combined between spans as long as the total capacity of the span between two switches equals the total capacity between other switches in the ring. In addition, the sum of the capacities of the working lines between two switches must equal the sum of the capacities of the protection lines between the switches. In the ring network shown in FIG. 7, for example, the sum of the optical capacities between each set of switches is a total of OC-48. This total may be reached using any combination of OC carrier lines. For example, the spans between switches 710 and 720 reach this total using four OC-12 lines while the spans between switches 720 and 730 reach this total using one OC-48 line. Switches 710, 720, 730, 740 direct traffic from a single OC-48 to four OC-12 lines.

Figure 8:
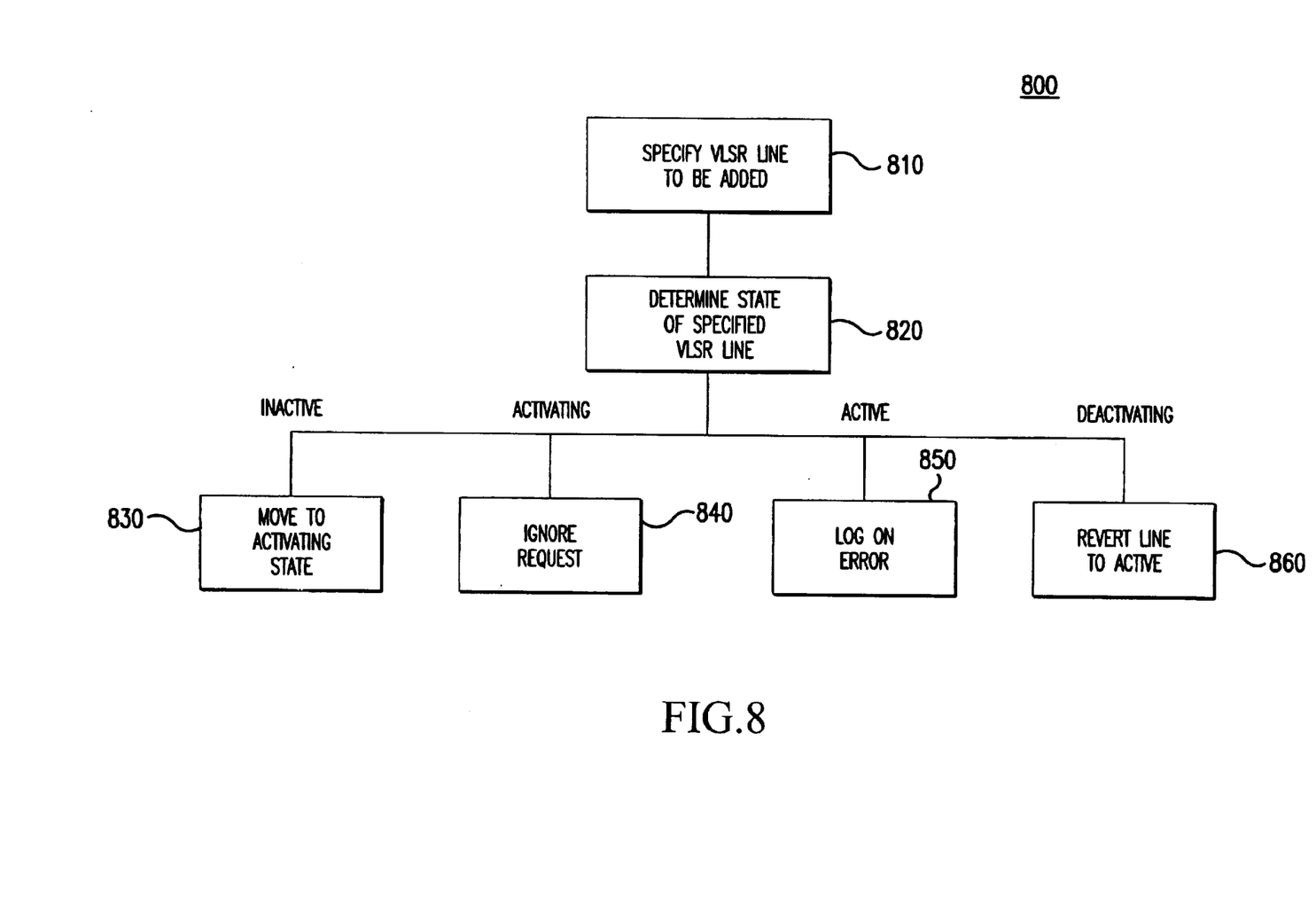
FIG. 8 shows the steps of adding a line to a virtual line switched ring in accordance with the present invention.

Moreover, in accordance with the present invention, lines may easily be added or removed from the ring. However, before a line is made active or inactive, the switches on both sides of the line determine whether the line change maintains the required optical carrier capacity between switches. FIG. 8 shows the steps 800 performed by manager module 413 when adding a line. First, a system administrator specifies the line to make active by inputting a request, including a line identifier, into manager module 413 at a switch at either end of the new line (step 810). This line ID must be the same on both ends of the line. All of the switches identify the line using the same identifier, as discussed above with respect to FIG. 6. Manger module 413 determines the state of the specified line from the monitor modules 424 (step 820). Monitor modules 424 maintain information regarding the state of each line based on the line identifier. Lines are only used for actual transmission when in the active state. The activating state refers to the state before monitor modules 424 on either side of a line have agreed to placing a line in the active state. Similarly, the deactivating state is the state before the monitor module have agreed to placing a line in the inactive state. When a line is physically added, the monitor module 424 automatically designates the line as being in an inactive state. If the line to be added is in fact inactive, then the line is moved to the activated state (step 830). If however, the specified line is already in the activating state, then manager module 413 ignores the request (step 840). If the line specified is already active, then manager module 413 logs an error in a central accessible log (step 850). If the specified line is in a deactivating state, then manager module 413 directs the monitor module 424 to place the line back in the active state (step 860).

Figure 9:
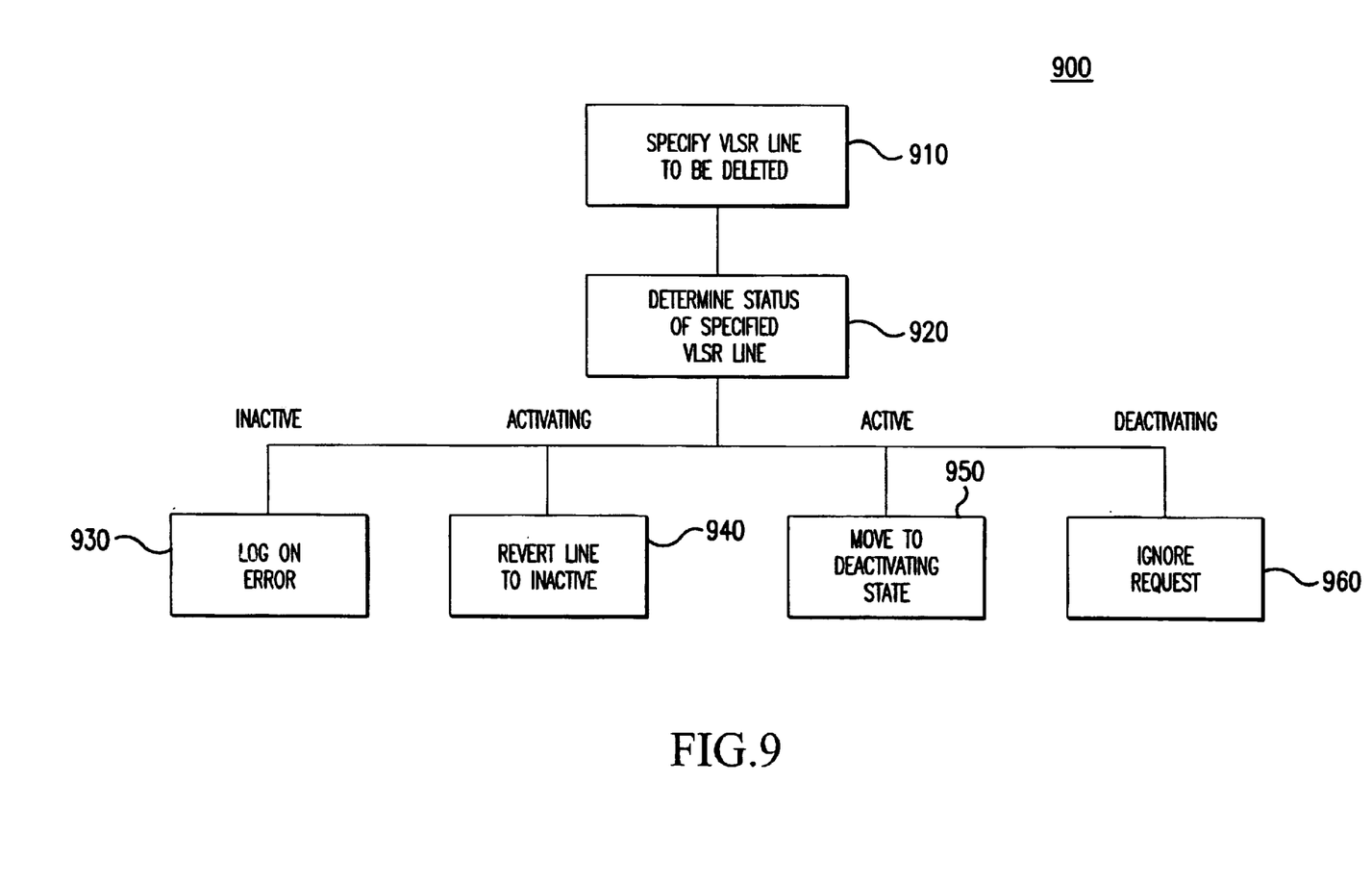
FIG. 9 shows the steps for deleting a line form a virtual line switched ring in accordance with the present invention.

FIG. 9 shows the steps 900 performed by manager module 413 when deleting a line. First, a system administrator specifies the line to be deleted by inputting a request, including a line identifier, into manager module 413 at a switch at either end of the line (step 910). Manager module 413 queries monitor module 424 to determine the status of the specified line (step 920). If the specified line is inactive, then manager module 413 takes an error in a central accessible log and does not take further action (step 930). If the designated line is in the activating state, then manager module 413 directs monitor module 424 to revert the line to an inactive state (step 940). If the specified line is in the active state, then manager module 413 directs monitor module 424 to place the BLSR line in a deactivating state (step 950). If the specified line is already in the deactivating state, then manager module 413 ignores the request (step 960).

Figure 10:
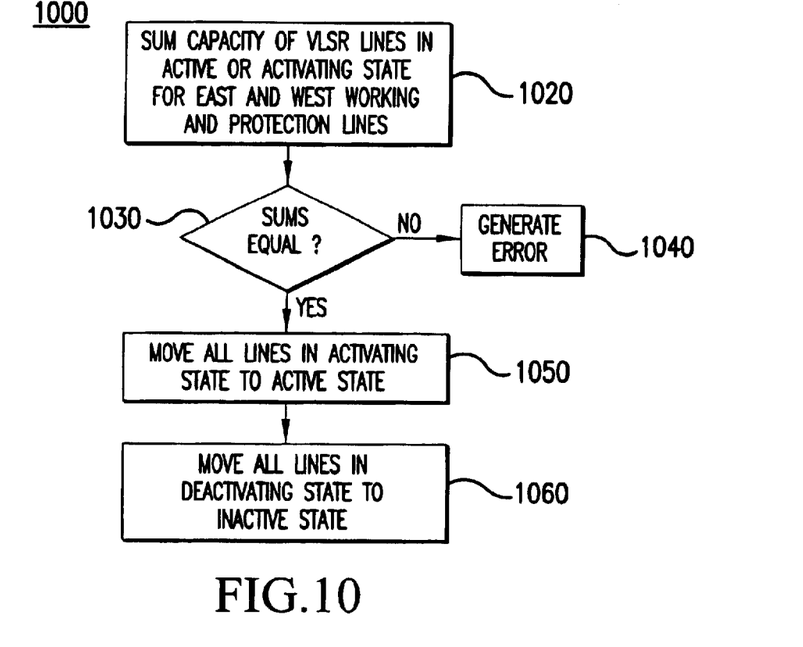
FIG. 10 shows the steps for validating a new line configuration in a virtual line switched ring in accordance with the present invention.

FIG. 10 shows steps 1000 performed by manager module 413 when validating a new configuration of lines after lines have been added or deleted. To validate the configuration, manager module 413 first sums the capacity of the lines associated with span west lines 416 that are in the active state or activating state (step 1020). The sum of the capacity of the active lines in the span west lines 414 should equal the summation of the capacity of the active lines in the span east lines 416. Manager module 413 determines whether these sums are equal (step 1030) and, if not, an error is generated and logged (step 1040). If the sums are equal, then manager module 413 directs monitor modules 424 to move all of the lines in the activating state to the active state (step 1050). Similarly, manager module 413 directs the monitor modules to move all the lines in the deactivating state to the inactive state (1060). Manager module 413 in each switch in the ring network performs this check before validating any configuration.

Figure 13:
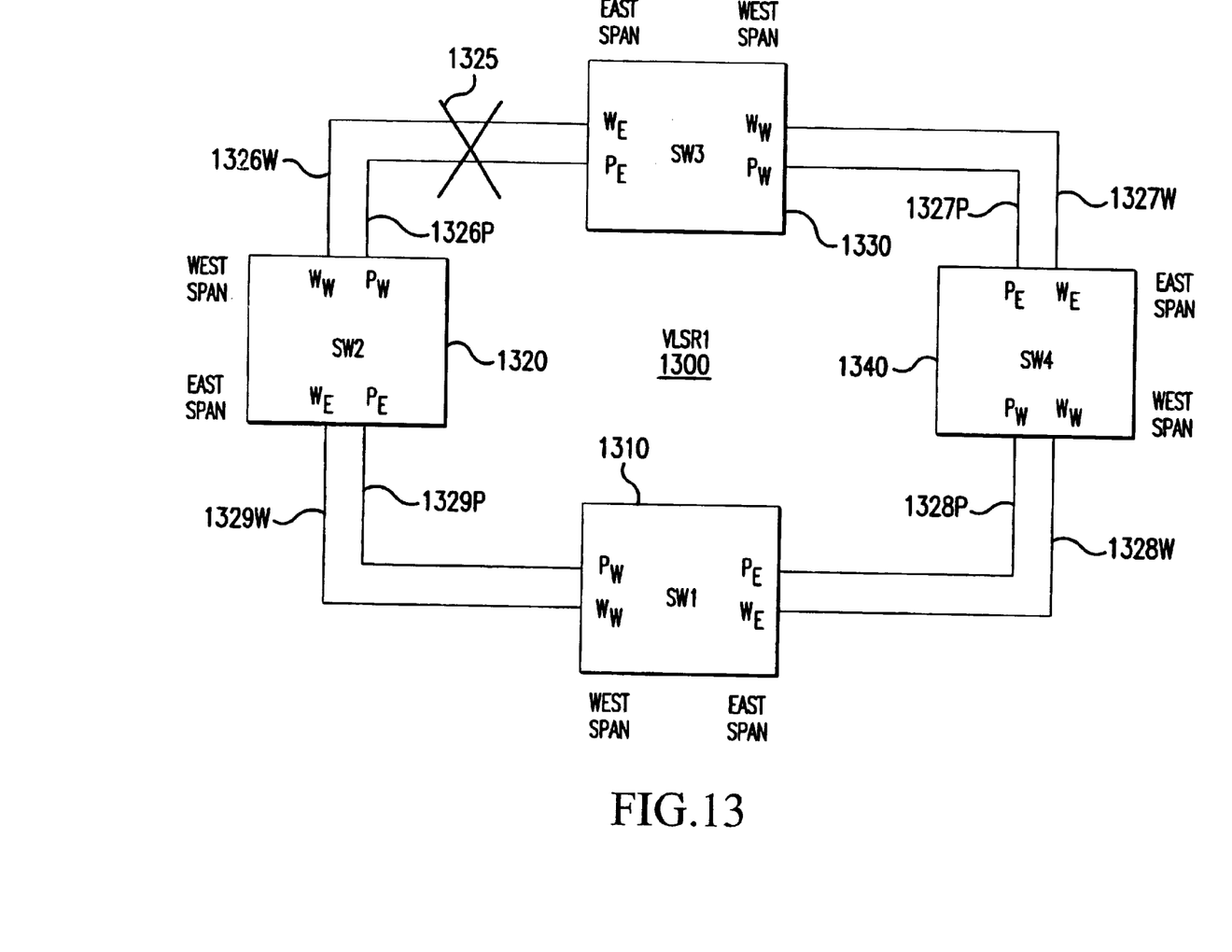
FIG. 13 illustrates a SONET ring network configured in accordance with a feature of the present invention.

Referring now to FIG. 4B in conjunction with FIG. 13, the CSDP controller 475 of the CSDP manager 415 can trigger the configuration module 455 to generate a CSDP Configuration ("Config") message, which is transmitted around a ring (e.g., a VLSR or BLSR). Typically, the transmission of the CSDP Config messages is initiated after a ring configuration change or initialization occurs. As each node receives the CSDP Config message, which was transmitted by the originating node, the other nodes can updates their topology table 470 with the topology information contained within the received CSDP Config message.

In one embodiment, the CSDP Config message includes a message ID, a sequence number, a ring ID, a node ID, an east lines value, a west lines value, an east line info field and a west line info field. The message ID is used to identify the type of message and the version of message (e.g., CSDP Config v. 1). The sequence number is used by the nodes to identify each CSDP Config message. The ring ID represents a unique identifier for the ring. The node ID represents a unique identifier to the ring node. The east lines value represents the number of working lines on the east span of the ring node. The west lines value represents the number of working lines on the west span. The east line info represents the line identifier and the number of line timeslots for the east working line. The west line info represents the line identifier and the number of line timeslots for the west working line. By receiving this information from each node on a ring, the CSDP modules 415 of a specific node can generate a topology table 470 of the topology of the ring.

To further illustrate the characteristics of the CSDP Config message, an embodiment of a virtual line switched ring ("VLSR") 1300, as illustrated in FIG. 13, will be used for exemplary purposes. Typically in one embodiment of the present invention, upon the addition of a node, such as node 1310, into the VLSR ring 1300, the controller 412 will trigger the CSDP controller 475 to initiate the configuration module 455 to generate a CSDP Config message that includes configuration information about node 1310. As previously discussed, the CSDP Config message includes information such as the ring (e.g., VLSR1) to which node 1310 is being added, an identifier (e.g., SW1) representing a logical ring node representation for node 1310, the number of working lines for the east span and west span lines of the node 1310 and information, including line identifiers and the number of line timeslots for the east span and west span lines.

Upon transmission of the CSDP config message onto the ring 1300 (e.g., along the west span), the CSDP manager 415 takes advantage of the fact that as long as all of the intermediate nodes between the east and west span of the originating node (e.g., nodes 1320, 1330 and 1340) forward a message correctly across the closed ring 1300, a message, such as a CSDP Config message, which is sent in one direction (e.g., out the west span of the node 1310), will ultimately be received in the other direction (e.g., at the east span of the node 1310). In one embodiment, CSDP messages, such as the CSDP config message, are transmitted over the working line 1329W of the ring 1300 within the SONET protocol's Data Communication Channel ("DCC"). To allow the CSDP manager 415 at each node within the ring 1300 to that the CSDP message is a CSDP config message, the message ID is set to CSDP Config v. 1. For the node 1310 originating the CSDP message, the sequence number within the CSDP config message is used to match the message sent on the west span with the message received back on the east span. For example, if the CSDP Config message with a specific sequence number, which was sent out of the originating node 1310, is not received back at the originating node on the opposite span due to the break 1325 in the ring 1300, the originating node 1310 is able to determine that there is a problem with the ring 1300. In addition, if multiple CSDP Config messages are outstanding for the node 1310, only the message with the latest nodal information would be retransmitted.

When an addition, deletion or modification of a connection or timeslot of a line associated with a node 1310 occurs, the CSDP manager 415 of that node triggers the state module 460 to generate a new CSDP state message with the new connection information (e.g., time slot information and port relationships) for the newly added, deleted or modified connection. In one embodiment, each CSDP state message transmitted describes the connection information of a single connection within the node 1310.

The information included within a CSDP state message includes a message ID, a sequence number, a ring ID, a node ID, a span ID, a line ID, line timeslots information, timeslot concatenation state, timeslot add/drop state, IS SDH, and ExcludeFixed. The message ID identifies the type of message (e.g., CSDP State) and the version of message. The sequence number is used to identify the specific CSDP state message, which was transmitted or received by a node. The ring ID is used to assign a unique identifier to the ring 1300. The node ID is used for assigning a unique identifier to the ring node. The span ID is used to identify the span (e.g., east or west) to which this state pertains. The line ID is used as a local line ID, which is assigned within the span, as to which the specific connection information pertains. The line timeslots represent the number of STS-1 timeslots on this line (e.g., 1, 3, 12, 48 or 192). The timeslot concatenation state information represents the state of each STS-1 transmitted on this line including a value representing the child of an associated STS-1 parent. With this timeslot information, the CSDP state message can verify connections across a span. The timeslot add/drop state can be used to represent the state of each STS-1 transmitted on this line. In particular, the timeslot add/drop state can be used to either delete a timeslot for such purposes as squelching a connection or for adding a connection entry into the connections table 465.

The CSDP state message, like the CSDP config message, typically is transmitted in one direction around the ring 1300 on the working lines (e.g., 1329W, 1326W, 1327W and 1328W) to the other CSDP modules 415 at the intermediate nodes (e.g., 1320, 1330 and 1340). The CSDP state message is used by these intermediate nodes to update each of their connections tables 465 with the new connection state information of a specific line on a specific span of a ring node. This scheme allows for smaller message sizes and reduced message parsing complexity, which thereby minimizes the network performance impact on the ring 1300. Upon reception of a CSDP state message, an intermediate node updates its local connections table 465 with the connection information specified in the message. A node uses this connection state information for purposes including to detect addition and/or deletion of connections at each node, to store current concatenation information during a ring switch and to squelch connections during a "partial" ring switch situation resulting from node isolation or multiple span failures.

Should there be a need for a node to update either its connections table 465 or the topology table 470 (e.g., due to corruption of the data in either table), the CSDP manager 415 of the node, which needs to updates its information, triggers the query module 450 to generate CSDP query messages. CSDP query messages can be used by that node to request the latest configuration state or connection state information from one or more other nodes. In particular, the CSDP query messages include a message ID, a ring ID and a node ID. Upon reception of the CSDP query message by the node designated by the node ID, the node begins transmitting CSDP config messages and/or CSDP state messages until it receives it's own messages back on its opposite span.

An embodiment of the present invention with regard to the CSDP Manager 415 next will be described by way of example with reference to FIG. 13. Within ring 1300, working traffic originating at switch 1330 and terminating at switch 1320 is passed along span 1325 in a east-west direction as indicated by arrow 1326. If a break occurs in span 1326 (as indicated by an "X"), traffic is rerouted through switches 1310 and 1340 using a protection line in span 1327, which is assigned in accordance with processes and structures identified above. In this case, a K-byte ring switch signal is supplied from switch 1330 to switch 1340 and then to switches 1310 and 1320 to thereby indicate use of the protection line in ring 1300, at least for particular time slots so affected by the break in span 1326. In particular, the traffic (e.g., timeslots) on the work line of the span 1326 is routed to the protect line on the other good span 1327. The node 1340 at the other end of the good span enters a Pass Through State where all the traffic entering on the protect line on span 1327 is "Passed Through" to the protect line on the other spans 1328, 1329.

On the Pass Through nodes 1340 and 1310, all timeslots on the east span 416 of the protect line are connected to the timeslots on the west span 414 of the protect line. However, there may be different sized connections (e.g., STS1, STS3c, STS12c etc.) on the work line, which failed due to the ring switch. This concatenation information, therefore, is passed to the Pass Through nodes 1340 and 1310 so that these nodes 1340 and 1310 can process the concatenation information. The CSDP module 415 is responsible for communicating, via the configuration module 455, this concatenation information around the ring 1300. Along with timeslot information, the CSDP module 415 also utilizes the configuration module 455 to distribute additional topology information around the ring 1300 to each of the nodes. This enables the CSDP module 415 for each node to auto discover the entire ring topology and to alert the corresponding node if the ring 1300 is not configured properly. When a node originates a CSDP config message or CSDP state message, the node transmits it on the east span. Intermediate nodes, after recording the configuration information for its own topology table 470, forward the message around the rest of the ring until it terminates at the originating node. In one embodiment, if care is taken to avoid reordering messages, the sequence number can be ignored by intermediate nodes. In an embodiment, the CSDP messages normally are transmitted over a working line. During protection switches, the DCC can be automatically protected via the protection line. In the event of a broken ring (node failure or multiple span failures not protected by partial ring switches), however, CSDP information can not be reliably distributed, so CSDP messages are not sent. Once the ring reachieves connectivity, CSDP state messages and CSDP config messages can be flooded to every node to update the connections table 465 and the topology table 470 with current ring and nodal information.

In conclusion, the SONET ring network of the present invention uses switches as the network nodes to allow sharing a switch to connect a plurality of rings. A protection line between a plurality of rings is shared by utilizing overhead provided for in SONET standard protocols. Moreover, the shared protection line can be used by one ring over a first time slot and a second ring over a second time slot. Thus, capacity which would otherwise be used for carrying dedicated protection traffic is utilized by additional working traffic instead. As a result, network capacity is increased without adding more physical lines. Furthermore, the present invention provides for having a different number and type of lines between switches in a ring network by using switches and an algorithm to regulate the updating of the lines. Lastly, the present invention utilizes a CSDP messaging scheme to allow for each node on a ring to be able to generate and continually update its connections table and topology table to accurately reflect the current characteristics of the ring(s) in which the node is connected.

Other embodiments, including utilizing the CSDP messages on a multi-ring network, will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A connection state communication system within a line switched ring network comprising:

a query module adapted to generate a connection state distribution protocol query message;

a configuration module adapted to generate a connection state distribution protocol configuration message;

a state module adapted to generate a connection state distribution protocol state message;

a connections table adapted to store connection information regarding a node within the line switched ring network;

a topology table adapted to store topology information regarding the line switched ring network; and a controller coupled to the query module, the configuration module, the state module, the connections table and the topology table, adapted to manage the transmission and receipt of connection state distribution protocol messages.

* * * * *